United States Patent
Huang et al.

(10) Patent No.: US 12,323,504 B2
(45) Date of Patent: Jun. 3, 2025

(54) CLOCK CORRECTION METHOD AND CLOCK CORRECTION CIRCUIT

(71) Applicant: Realtek Semiconductor Corporation, Hsinchu (TW)

(72) Inventors: Tien Ke Huang, Hsinchu (TW); Chao-Yuan Hsu, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 114 days.

(21) Appl. No.: 18/479,815

(22) Filed: Oct. 2, 2023

(65) Prior Publication Data

US 2024/0372695 A1 Nov. 7, 2024

(30) Foreign Application Priority Data

May 5, 2023 (TW) .................................. 112116860

(51) Int. Cl.
*H04L 7/00* (2006.01)
*H04B 17/20* (2015.01)
*H04L 7/033* (2006.01)
*H04L 25/00* (2006.01)
*H04L 25/40* (2006.01)

(52) U.S. Cl.
CPC ......... *H04L 7/0087* (2013.01); *H04B 17/204* (2023.05); *H04L 7/0337* (2013.01)

(58) Field of Classification Search
CPC ... H04L 7/0087; H04L 7/0337; H04B 17/204; H03L 7/00; H04W 56/001; H04W 56/0015; G06F 1/324; G06F 1/04; G06F 1/3203; G06F 1/08

USPC ................. 375/371, 373, 375, 354
See application file for complete search history.

(56) References Cited

U.S. PATENT DOCUMENTS

| | | | | |
|---|---|---|---|---|
| 5,844,435 A | * | 12/1998 | Grundvig | G06F 1/08 327/160 |
| 5,987,339 A | * | 11/1999 | Asano | H03L 7/00 455/343.1 |
| 6,809,556 B1 | * | 10/2004 | Bronfer | G06F 1/08 327/99 |

(Continued)

FOREIGN PATENT DOCUMENTS

| | | |
|---|---|---|
| CN | 102405678 B | 1/2014 |
| CN | 105873190 B | 4/2019 |

*Primary Examiner* — Phuong Phu
(74) *Attorney, Agent, or Firm* — CKC & Partners Co., LLC

(57) ABSTRACT

A clock correction method suitable for a communication device comprising a clock correction circuit comprises: in response to the communication device being enabled and entering an active mode, calculating, by the clock correction circuit, a clock-period ratio between a slow clock and a fast clock; in response to the communication device operating in a power-saving mode for a power-saving period, counting at least one rising edge of the slow clock received by the clock correction circuit during the power-saving period, as a cumulative number; in response to the communication device switching to an active mode, calculating the difference between an internal time of the communication device and a reference time of another communication device as a time offset; and in the active mode, adjusting, by the clock correction circuit, the clock-period ratio by using a compensation value related to the clock-period ratio, the cumulative number and the time offset.

20 Claims, 2 Drawing Sheets

(56) References Cited

U.S. PATENT DOCUMENTS

| | | | |
|---|---|---|---|
| 2011/0035613 A1* | 2/2011 | Rancurel | G06F 1/3203 |
| | | | 713/323 |
| 2012/0120993 A1* | 5/2012 | Lin | H04W 56/0015 |
| | | | 375/222 |
| 2013/0159747 A1* | 6/2013 | Hughes | G06F 1/04 |
| | | | 713/322 |
| 2019/0196563 A1* | 6/2019 | Lai | G06F 1/324 |
| 2022/0046538 A1* | 2/2022 | Warneke | H04W 56/001 |

* cited by examiner

CLOCK CORRECTION METHOD AND CLOCK CORRECTION CIRCUIT

RELATED APPLICATIONS

This application claims priority to Taiwan Application Serial Number 112116860, filed on May 5, 2023, which is herein incorporated by reference in its entirety.

BACKGROUND

Technical Field

Present disclosure is related to the clock correction of a communication device. More particularly, the present disclosure is related to a clock correction method and a clock correction circuit.

Description of Related Art

Power efficiency is one of the most important performance indicators of communication devices in present years. In order to reduce the power consumption of the device, modern communication devices usually switch to a power-saving mode when the system is idle, and the clocks of the circuits and counters used for the operation of the digital circuit are switched to a slow clock at a low frequency (e.g., 32768 Hz), so as to save energy. On the other hand, the clock used by the communication device to perform system and communication functions is a fast clock at a high frequency (e.g., 26 MHZ).

The fast clock and the slow clock can be generated by different oscillator circuits respectively. Since the oscillator circuit of the slow clock is easily affected by temperature, in modern communication devices, temperature changes are often used as a criterion for performing a slow clock correction. However, if the criterion for performing correction is too strict (e.g., when the temperature difference is greater than 15° C.), it is easy to make the communication quality decrease due to the error of the slow clock frequency. On the contrary, if the criterion for performing correction is too loose (e.g., when the temperature difference is greater than 3° C.), it is easy to make the power consumption of the system increase due to too frequent corrections.

SUMMARY

A clock correction method is provided in present disclosure. The clock correction method is suitable for a communication device comprising a clock correction circuit, wherein the clock correction circuit is configured to receive a fast clock and a slow clock, the clock correction method comprises: in response to the communication device being enabled and entering an active mode, calculating, by the clock correction circuit, a clock-period ratio between the slow clock and the fast clock; in response to the communication device operating in a power-saving mode for a power-saving period, counting at least one rising edge of the slow clock received by the clock correction circuit during the power-saving period, as a cumulative number of slow clock periods; in response to the communication device switching from the power-saving mode to the active mode, calculating the difference between an internal time of the communication device and a reference time of another communication device as a time offset; and in the active mode, adjusting, by the clock correction circuit, the clock-period ratio by using a compensation value, wherein the compensation value is related to the clock-period ratio, the cumulative number of slow clock periods and the time offset.

A clock correction method is further provided in present disclosure. The clock correction method is suitable for a communication device comprising a clock correction circuit, wherein the clock correction circuit is configured to receive a fast clock and a slow clock, the clock correction method comprises: in response to the communication device being enabled and entering an active mode, calculating, by the clock correction circuit, a clock-period ratio between the slow clock and the fast clock; in response to the communication device operating in a power-saving mode for a power-saving period, counting at least one rising edge of the slow clock received by the clock correction circuit during the power-saving period, as a cumulative number of slow clock periods; in response to the communication device switching from the power-saving mode to the active mode, calculating the difference between an internal time of the communication device and a reference time of another communication device as a time offset; and in the active mode, adjusting, by the clock correction circuit, the clock-period ratio by using a compensation value, wherein the compensation value is related to a product of the square of the clock-period ratio, the time offset and the reciprocal of the cumulative number of slow clock periods.

A clock correction circuit is provided in present disclosure. The clock correction circuit is configured to be arranged in a communication device and configured to receive a fast clock and a slow clock, wherein the clock correction circuit comprises a fast clock counter, a slow clock counter, a control circuit and a storage circuit. The fast clock counter is configured to receive the fast clock and count at least one rising edge of the fast clock. The slow clock counter is configured to receive the slow clock and count at least one rising edge of the slow clock. The control circuit is coupled to the fast clock counter and the slow clock counter, and configured to: in response to the communication device being enabled and entering an active mode, calculate a clock-period ratio between the slow clock and the fast clock; in response to the communication device operating in a power-saving mode for a power-saving period, count at least one rising edge of the slow clock received by the communication device during the power-saving period, as a cumulative number of slow clock periods; in response to the communication device switching from the power-saving mode to the active mode, calculate the difference between an internal time of the communication device and a reference time of another communication device as a time offset; and in the active mode, adjust the clock-period ratio by using a compensation value, wherein the compensation value is related to the clock-period ratio, the cumulative number of slow clock periods and the time offset. The storage circuit is coupled to the fast clock counter, the slow clock counter and the control circuit, and configured to store the number of the at least one rising edge of the fast clock, the number of the at least one rising edge of the slow clock, the clock-period ratio and the length of the power-saving period.

Through the clock correction method and the clock correction circuit of the present disclosure, the number of times of repeated corrections of the communication device in the same mode due to environmental dynamic changes (e.g., temperature) can be reduced, thereby reducing the power consumption of the communication device.

It should be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
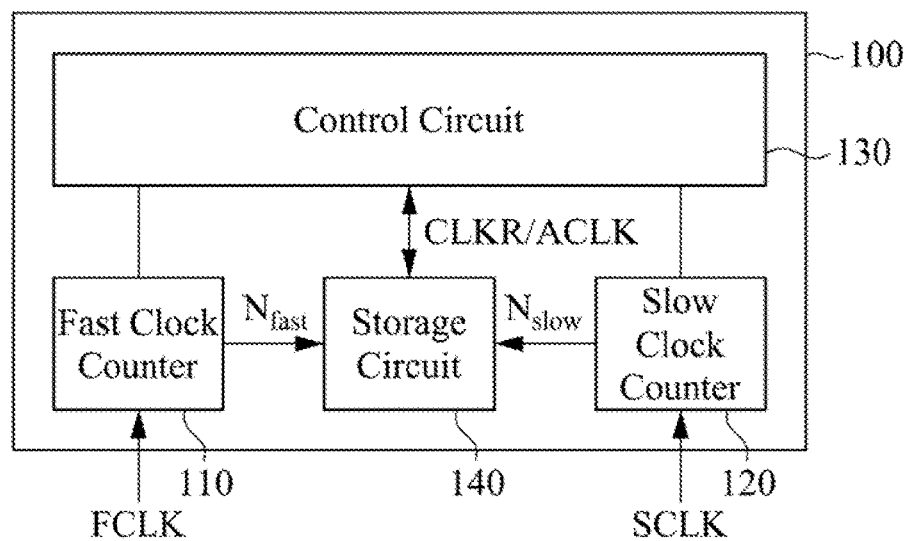
FIG. 1 is a simplified functional block diagram of a clock correction circuit in accordance with some embodiments of the present disclosure.

Reference will now be made in detail to the embodiments of the present disclosure, examples of which are illustrated in the accompanying drawings. In the drawings, the same labels represent the same or similar elements or methods.

In the present disclosure, when a component is referred to as "connected" or "coupled", it may mean "electrical connected" or "electrical coupled". The term "coupled" or "connected" used throughout the present disclosure may refer to two or more elements physically or optically contact with each other in direct, or physically or optically contact with each other in indirect, or two or more elements interact or act on each other. Unless the article is specifically limited in the present disclosure, "a" and "the" can generally refer to one or more. It will be further understood that the terms "comprising", "including", "having" and similar words used herein indicate the features, regions, integers, steps, operations, elements and/or components described therein, but do not exclude one or more other features, regions, integers, steps, operations, elements, components and/or groups thereof.

FIG. 1 is a simplified functional block diagram of a clock correction circuit 100 in accordance with some embodiments of the present disclosure. The clock correction circuit 100 is configured to receive a fast clock FCLK and a slow clock SCLK, and comprises a fast clock counter 110, a slow clock counter 120, a control circuit 130 and a storage circuit 140. In some embodiments, the clock correction circuit 100 is arranged in a communication device (not shown).

The fast clock counter 110 is coupled to the control circuit 130 and the storage circuit 140, and controlled by the control circuit 130 to receive the fast clock FOLK from an external circuit (not shown, e.g., a phase-locked loop of a communication device) and count the rising edges of the fast clock FOLK in a given time period. The slow clock counter 120 is coupled to the control circuit 130 and the storage circuit 140, and controlled by the control circuit 130 to receive the slow clock SCLK from another external circuit (not shown, e.g., another phase-locked loop or crystal oscillator of the communication device) and count the rising edges of the slow clock SCLK in the given time period.

The control circuit 130 is coupled to the fast clock counter 110, the slow clock counter 120 and the storage circuit 140, and configured to control the fast clock counter 110, the slow clock counter 120 and the storage circuit 140 according to the operation status of the communication device, so as to calculate or adjust the ratio between the period of the fast clock FCLK and the period of the slow clock SCLK (hereinafter referred to as "clock-period ratio CLKR").

The storage circuit 140 is coupled to the fast clock counter 110, the slow clock counter 120 and the control circuit 130, and configured to store the number of the rising edges of the fast clock FCLK counted by the fast clock counter 110, the number of the rising edges of the slow clock SCLK counted by the slow clock counter 120 and the clock-period ratio CLKR calculated by the control circuit 130. In some embodiments, the storage circuit 140 may be implemented with a register circuit.

Figure 2:
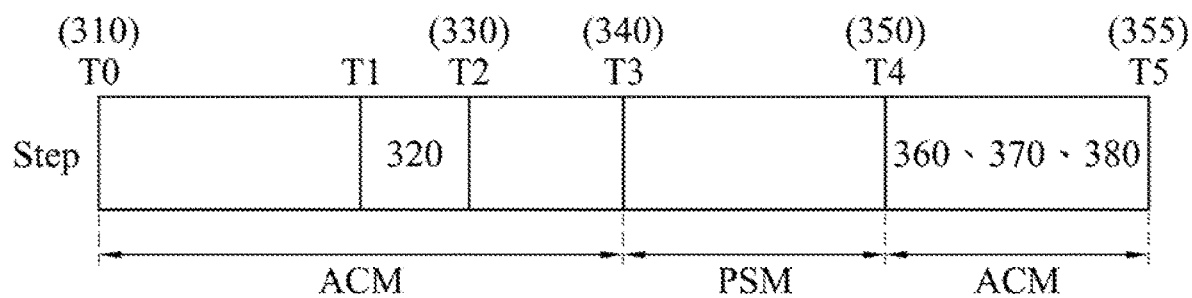
FIG. 2 is a timing diagram of a clock correction performed by the clock correction circuit in accordance with some embodiments of the present disclosure.

Please refer to FIG. 1 and FIG. 2 together. FIG. 2 is a timing diagram of the clock correction performed by the clock correction circuit 100 in accordance with some embodiments of the present disclosure. The control circuit 130 is configured to determine whether the communication device is operating in an active mode ACM or a power-saving mode PSM. In some embodiments, the communication device operates according to the fast clock FCLK and the slow clock SCLK in the active mode ACM and the power-saving mode PSM respectively. The communication device can maintain time synchronization with another communication device (e.g., a base station of a code division multiple access (CDMA), 4G, 5G or narrowband Internet of things (NB-IoT) cellular network) for communication based on the fast clock FOLK in the active mode ACM. The communication device is configured to use the clock-period ratio CLKR to calculate how many periods of the fast clock FCLK that the time length of the power-saving mode PSM is equivalent to, so as to ensure that the time synchronization with the another communication device can still be maintained when the communication device switches from the power-saving mode PSM to the active mode ACM (i.e., switches from operating based on the slow clock SCLK to operating based on the fast clock FCLK). The method in which the control circuit 130 controls the fast clock counter 110, the slow clock counter 120, the storage circuit 140 and calculates the clock-period ratio CLKR will be described in detail in following paragraphs.

Figure 3:
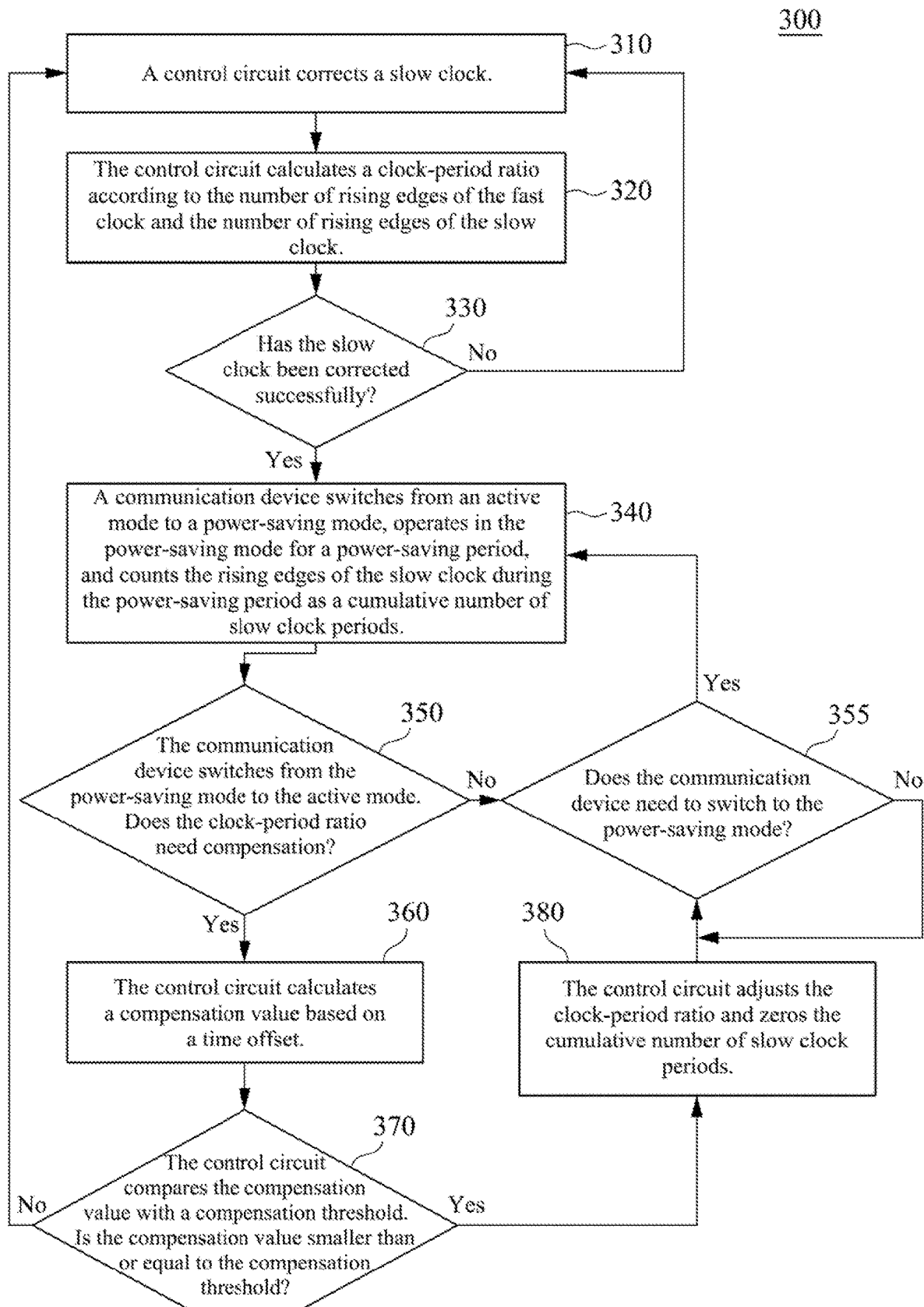
FIG. 3 is a flowchart of a clock correction method in accordance with some embodiments of the present disclosure.

Please refer to FIG. 2 and FIG. 3 together. In the embodiment of FIG. 2, time T0-T5 represent time points when the clock correction circuit 100 performs different operations. FIG. 3 is a flowchart of a clock correction method 300 in accordance with some embodiments of the present disclosure. In some embodiments, the clock correction method 300 comprises steps 310, 320, 330, 340, 350, 355, 360, 370 and 380.

At time T0, the communication device is enabled (i.e., powered on) and enter the active mode ACM to perform system functions (e.g., setting parameters required for operation) or communication functions (e.g., time synchronization with another communication device), and step 310 is performed. In step 310, the control circuit 130 corrects the slow clock SCLK. Operationally, the communication device may correct the fast clock FCLK by time synchronizing with another communication device (e.g., a base station of a CDMA, 4G, 5G or NB-IoT cellular network), and then further correct the slow clock SCLK according to the fast clock FCLK. For example, the aforementioned time synchronization indicates that the communication device operates with a clock with the same frequency accuracy as another connected communication device (e.g., a base station of a CDMA, 4G, 5G or NB-IoT cellular network).

At time T1, the communication device has finished the system functions and the communication functions performed when the communication device was powered on, and step 320 is performed at this time. In step 320, the control circuit 130 calculates the clock-period ratio CLKR according to the number of rising edges of the fast clock FCLK and the number of rising edges of the slow clock SCLK, and then corrects the slow clock SCLK. In the operation of calculating the clock-period ratio CLKR, the control circuit 130 sets a measurement duration (e.g., n periods of the slow clock SCLK, wherein n is a positive integer) first, the fast clock counter 110 and the slow clock counter 120 respectively transmit the number of rising edges of the fast clock FOLK and the number of rising edges of the slow clock SCLK received within the measurement duration to the storage circuit 140, and then the control circuit 130 calculates the clock-period ratio CLKR according to Formula 1. Formula 1 is as follows:

$$CLKR = \frac{T_{fast}}{T_{slow}} = \frac{N_{slow}}{N_{fast}}. \quad (1)$$

$T_{fast}$ represents the period of the fast clock FOLK, $T_{slow}$ represents the period of the slow clock SCLK, $N_{fast}$ represents the number of rising edges of the fast clock FOLK in the measurement duration, and $N_{slow}$ represents the number of rising edges of the slow clock SCLK in the measurement duration.

Next, in step 330, the control circuit 130 determines whether the slow clock SCLK has been corrected successfully, so as to determine whether the next step to be performed is step 340 or step 310.

Take the embodiment in FIG. 2 as an example, time T2 is the time point when the control circuit 130 finishes the correction of the slow clock SCLK (i.e., the time point when step 330 is performed). Since time T2 is later than time T1, it indicates that the system of the communication device has been stabilized (e.g., all parameters required for operation have been set, or time synchronization with another communication device has been completed) before the communication device finishing the correction of the slow clock SCLK. Therefore, in step 330, the control circuit 130 determines that the slow clock SCLK has been corrected successfully, and step 340 will be performed next.

On the contrary, in some embodiments not shown, when the control circuit 130 is calculating the clock-period ratio CLKR, if a large time or frequency offset adjustment is performed on the communication device, and time T2 is earlier than time T1, the control circuit 130 will determine that at time T2, the fast clock FCLK has not yet settled as a standard reference for correction, thus the clock-period ratio CLKR calculated in step 320 may be inaccurate, and then the control circuit 130 will determine that the correction of the clock fails, and step 310 will be performed again.

After time T2, if the communication device does not receive any instruction during a standby period (e.g., from time T2 to time T3) in the active mode ACM, step 340 will be performed. In step 340, the communication device switches from the active mode ACM to the power-saving mode PSM, and operates according to the slow clock SCLK in the power-saving mode PSM for a power-saving period, so as to reduce the energy consumption of the communication device. In some embodiments, the time length of the power-saving period can be stored in the storage circuit 140 in advance.

In some embodiments, the fast clock FOLK of the communication device is synchronized with another connected communication device (e.g., a base station of a CDMA, 4G, 5G or NB-IoT cellular network) and has high accuracy, so the control circuit 130 can calculate the time length of the power-saving period as $M_{fast}$ periods of the fast clock FCLK according to the communication parameters (e.g., the next paging occasion) of the communication device and system settings, wherein $M_{fast}$ is a positive integer.

However, since the communication device operates according to the slow clock SCLK in the power-saving mode PSM and switches to operate according to the fast clock FOLK before the power-saving mode PSM ends, the control circuit 130 may convert the time length of the power-saving period to a combination of the period of the slow clock SCLK and the period of the fast clock FCLK according to Formula 2, wherein the last term in the period of the fast clock FCLK represents the time length that the communication device operates according to the fast clock FCLK before the power-saving mode PSM ends. Formula 2 is as follows:

$$\begin{aligned} \text{Time Length of Power-Saving Period} &\quad (2) \\ &= M_{fast} \cdot T_{fast} \\ &= M_{slow} \cdot CLKR \cdot T_{slow} \\ &= \lfloor M_{fast} \cdot CLKR \rfloor \cdot T_{slow} + (M_{fast} \cdot CLKR - \lfloor M_{fast} \cdot CLKR \rfloor) \cdot T_{slow} \\ &= \lfloor M_{fast} \cdot CLKR \rfloor \cdot T_{slow} + \left( M_{fast} - \frac{\lfloor M_{fast} \cdot CLKR \rfloor}{CLKR} \right) \cdot T_{fast}. \end{aligned}$$

The operation symbol "$\lfloor \rfloor$" is the lower integer symbol (i.e., floor function).

In addition, in some embodiments, the control circuit 130 may count total rising edges of the slow clock SCLK, which are in the time that the communication device operates in the power-saving mode PSM (hereinafter referred to as "cumulative number of slow clock periods ACLK"). In some embodiments, the initial value of the cumulative number of slow clock periods ACLK is 0 when the communication device is powered on.

It should be noted that step 340 will not be performed before step 330, that is, time T3 will not be earlier than time T2. In other words, before the control circuit 130 finishes calculating the clock-period ratio CLKR, the communication device will not switch from the active mode ACM to the power-saving mode PSM.

After the power-saving period (i.e., from time T3 to time T4), step 350 will be performed, in which the communication device switches from the power-saving mode PSM to the active mode ACM, and the control circuit 130 determines whether to compensate the clock-period ratio CLKR.

Operationally, the communication device may time synchronize with another communication device (e.g., a base station of a CDMA, 4G, 5G or NB-IoT cellular network) when switching from the power-saving mode PSM to the active mode ACM, so as to obtain a reference time (e.g., time stamp) from the another communication device. In addition, since the period of the slow clock SCLK may change with the external environment (e.g., temperature), there may be an error (hereinafter referred to as "time offset $\Delta_n$") between the internal time of the communication device and the aforementioned reference time after the power-saving mode PSM ends. In step 350, the communication device calculates the time offset $\Delta_n$, for example, calculates the time error between its own time stamp and the time stamp of another communication device. The use of the time offset $\Delta_n$ will be described in the following paragraphs.

Please refer to step 350 again. After finishing the time synchronization, the communication device further determines to compensate, partially compensate or not compensate the clock-period ratio CLKR according to the reliability of the time synchronization (e.g., signal-to-noise ratio). For example, when the signal-to-noise ratio of the communication signal is lower than a signal-to-noise ratio threshold, it indicates that the result of the time synchronization is unreliable (i.e., the reference time or the time offset $\Delta_n$ may be wrong), thus the communication device does not need to compensate the clock-period ratio CLKR, and step 355 will be performed.

In step 355, the communication device determines whether it needs to enter the power-saving mode PSM. When the communication device determines that it does not need to enter the power-saving mode PSM, step 355 will be performed repeatedly, and the communication device will continue operating in the active mode ACM. On the contrary, when communication device determines that it needs to enter the power-saving mode PSM, step 340 will be performed again.

In other words, when the flow of the clock correction method 300 proceeds from step 350 to step 355 and returns to step 340, it indicates that the communication device switches from the active mode ACM to the power-saving mode PSM again without compensating the clock-period ratio CLKR, thus the control circuit 130 will continue to accumulate the cumulative number of slow clock periods ACLK.

On the other hand, when the signal-to-noise ratio of the communication signal is higher than or equal to the signal-to-noise ratio threshold, it indicates that the result of the time synchronization is reliable (i.e., the reference time is substantially correct, or the time offset $\Delta_n$ is substantially correct), thus step 360 will be performed, in which the communication device compensates the clock-period ratio CLKR.

In step 360, the control circuit 130 calculates a compensation value through Formula 3 based on the time offset $\Delta_n$ obtained in step 350. Formula 3 is as follows:

$$\text{Compensation Value} = \text{Compensation Weight} \times (-\frac{\Delta_n CLKR^2}{ACLK}). \quad (3)$$

In some embodiments, the compensation weight is a value between 0 and 1. In other embodiments, the control circuit 130 can determine the value of the compensation weight according to the signal-to-noise ratio, for example, the compensation weight is set to be positively correlation with the signal-to-noise ratio.

In some embodiments, the compensation weight can be omitted from Formula 3.

It should be noted that if the system of the communication device experiences connection failure or out-of-sync, the time offset $\Delta_n$ may be wrong, and thus the compensation value may also be wrong. Therefore, in step 370, the control circuit 130 compares the compensation value with a compensation threshold, so as to determine whether the compensation value is reasonable.

In some embodiments, a plurality of compensation threshold values respectively corresponding to a plurality of operating temperatures of the clock correction circuit 100 are stored in the storage circuit 140. The control circuit 130 may select corresponding compensation threshold according to the current operating temperature of the clock correction circuit 100.

If the compensation value is greater than the compensation threshold, it indicates that the compensation value is out of the reasonable range, and the control circuit 130 will not use the compensation threshold to correct the clock-period ratio CLKR. At this time, step 310 may be performed again, so that the communication device corrects the slow clock SCLK again based on the time synchronization with another communication device, and the subsequent steps are performed.

On the other hand, if the compensation value is smaller than or equal to the compensation threshold, it indicates that the compensation value is reasonable, and step 380 will be performed. In step 380, the control circuit 130 obtains adjusted clock-period ratio CLKR by subtracting the compensation value from the original clock-period ratio CLKR, and zeros the cumulative number of slow clock periods ACLK. In some embodiments, after step 380 ends (i.e., at time T5), step 355 will be performed.

It should be noted that the number and order of steps 310-380 in the clock correction method 300 in present disclosure are only examples, and are not intended to limit the present disclosure. The other number and order of steps in the clock correction method 300 are within the scope of the present disclosure. In some embodiments, steps 320 and 330 can be performed simultaneously in parallel.

Through the clock correction method 300 and the clock correction circuit 100 of the present disclosure, the clock-period ratio CLKR can be corrected only when the communication device switches from the power-saving mode PSM to the active mode ACM, so as to avoid repeated correction in the same operation mode (e.g., repeated correction due to frequent changes in operation temperature), thereby reducing the power consumption of the communication device. Based on the corrected clock-period ratio CLKR, the communication device can calculate the power-saving period precisely through Formula 2, so as to improve the communication quality with another communication device (e.g., a base station of a CDMA, 4G, 5G or NB-IoT cellular network).

The above are preferred embodiments of the present disclosure, and various modifications and equivalent changes may be made to the structure of the present disclosure without departing from the scope or spirit of the present disclosure. In view of the foregoing, it is intended that the present disclosure cover modifications and variations of this invention provided they fall within the scope of the following claims.

What is claimed is:

1. A clock correction method, suitable for a communication device comprising a clock correction circuit, wherein the clock correction circuit is configured to receive a fast clock and a slow clock, the clock correction method comprises:
   in response to the communication device being enabled and entering an active mode, calculating, by the clock correction circuit, a clock-period ratio between the slow clock and the fast clock;
   in response to the communication device operating in a power-saving mode for a power-saving period, counting at least one rising edge of the slow clock received by the clock correction circuit during the power-saving period, as a cumulative number of slow clock periods;
   in response to the communication device switching from the power-saving mode to the active mode, calculating the difference between an internal time of the communication device and a reference time of another communication device as a time offset; and in the active mode, adjusting, by the clock correction circuit, the clock-period ratio by using a compensation value, wherein the compensation value is related to the clock-period ratio, the cumulative number of slow clock periods and the time offset.

2. The clock correction method of claim 1, wherein adjusting, by the clock correction circuit, the clock-period ratio by using the compensation value comprises:
determining a compensation weight, wherein the compensation weight is positively correlated with the signal-to-noise ratio of the communication device; and
adjusting the clock-period ratio by using a product of the compensation value and the compensation weight.

3. The clock correction method of claim 2, wherein the compensation weight is between 0 and 1.

4. The clock correction method of claim 1, wherein the clock correction circuit is configured to compare the compensation value with a compensation threshold to determine whether to adjust the clock-period ratio.

5. The clock correction method of claim 1, wherein the communication device does not switch to the power-saving mode before the clock correction circuit finishes calculating the clock-period ratio.

6. The clock correction method of claim 1, wherein adjusting, by the clock correction circuit, the clock-period ratio by using the compensation value comprises:
subtracting the compensation value from the clock-period ratio, wherein the compensation value is negatively correlated with the square of the clock-period ratio, negatively correlated with the time offset, and positively correlated with the cumulative number of slow clock periods.

7. The clock correction method of claim 1, further comprising:
in response to the clock correction circuit adjusting the clock-period ratio by using the compensation value, zeroing, by the clock correction circuit, the cumulative number of slow clock periods.

8. A clock correction method, suitable for a communication device comprising a clock correction circuit, wherein the clock correction circuit is configured to receive a fast clock and a slow clock, the clock correction method comprises:
in response to the communication device being enabled and entering an active mode, calculating, by the clock correction circuit, a clock-period ratio between the slow clock and the fast clock;
in response to the communication device operating in a power-saving mode for a power-saving period, counting at least one rising edge of the slow clock received by the clock correction circuit during the power-saving period, as a cumulative number of slow clock periods;
in response to the communication device switching from the power-saving mode to the active mode, calculating the difference between an internal time of the communication device and a reference time of another communication device as a time offset; and
in the active mode, adjusting, by the clock correction circuit, the clock-period ratio by using a compensation value, wherein the compensation value is related to a product of the square of the clock-period ratio, the time offset and the reciprocal of the cumulative number of slow clock periods.

9. The clock correction method of claim 8, wherein adjusting, by the clock correction circuit, the clock-period ratio by using the compensation value comprises:
determining a compensation weight, wherein the compensation weight is positively correlated with the signal-to-noise ratio of the communication device; and
adjusting the clock-period ratio by using a product of the compensation value and the compensation weight.

10. The clock correction method of claim 9, wherein the compensation weight is between 0 and 1.

11. The clock correction method of claim 8, wherein the clock correction circuit is configured to compare the compensation value with a compensation threshold to determine whether to adjust the clock-period ratio.

12. The clock correction method of claim 8, wherein the communication device does not switch to the power-saving mode before the clock correction circuit finishes calculating the clock-period ratio.

13. The clock correction method of claim 8, further comprising:
in response to the clock correction circuit adjusting the clock-period ratio by using the compensation value, zeroing, by the clock correction circuit, the cumulative number of slow clock periods.

14. A clock correction circuit, configured to be arranged in a communication device and configured to receive a fast clock and a slow clock, wherein the clock correction circuit comprises:
a fast clock counter, configured to receive the fast clock and count at least one rising edge of the fast clock;
a slow clock counter, configured to receive the slow clock and count at least one rising edge of the slow clock;
a control circuit, coupled to the fast clock counter and the slow clock counter, and configured to:
in response to the communication device being enabled and entering an active mode, calculate a clock-period ratio between the slow clock and the fast clock;
in response to the communication device operating in a power-saving mode for a power-saving period, count at least one rising edge of the slow clock received by the communication device during the power-saving period, as a cumulative number of slow clock periods;
in response to the communication device switching from the power-saving mode to the active mode, calculate the difference between an internal time of the communication device and a reference time of another communication device as a time offset; and
in the active mode, adjust the clock-period ratio by using a compensation value, wherein the compensation value is related to the clock-period ratio, the cumulative number of slow clock periods and the time offset; and
a storage circuit, coupled to the fast clock counter, the slow clock counter and the control circuit, and configured to store the number of the at least one rising edge of the fast clock, the number of the at least one rising edge of the slow clock, the clock-period ratio and the length of the power-saving period.

15. The clock correction circuit of claim 14, wherein adjusting the clock-period ratio by using the compensation value comprises:
determining a compensation weight, wherein the compensation weight is positively correlated with the signal-to-noise ratio of the communication device; and
adjusting the clock-period ratio by using a product of the compensation value and the compensation weight.

16. The clock correction circuit of claim 15, wherein the compensation weight is between 0 and 1.

17. The clock correction circuit of claim 14, wherein the control circuit is further configured to compare the compensation value with a compensation threshold to determine whether to adjust the clock-period ratio.

18. The clock correction circuit of claim 14, wherein the communication device does not switch to the power-saving mode before the control circuit finishes calculating the clock-period ratio.

19. The clock correction circuit of claim 14, wherein adjusting the clock-period ratio by using the compensation value comprises:
   subtracting the compensation value from the clock-period ratio, wherein the compensation value is negatively correlated with the square of the clock-period ratio, negatively correlated with the time offset, and positively correlated with the cumulative number of slow clock periods.

20. The clock correction circuit of claim 14, wherein the control circuit is further configured to zero the cumulative number of slow clock periods in response to the clock-period ratio being adjusted by using the compensation value.

* * * * *